(12) United States Patent
Zauner et al.

(10) Patent No.: US 6,712,519 B2
(45) Date of Patent: Mar. 30, 2004

(54) SEALED BEARING

(75) Inventors: Günter Zauner, Peuerbach (AT); Michael Seyrl, Wels (AT)

(73) Assignee: Bombardier-Rotax GmbH, Gunskirchen (AT)

( * ) Notice: Subject to any disclaimer, the term of this patent is extended or adjusted under 35 U.S.C. 154(b) by 0 days.

(21) Appl. No.: 09/915,763

(22) Filed: Jul. 27, 2001

(65) Prior Publication Data

US 2002/0012485 A1 Jan. 31, 2002

Related U.S. Application Data

(60) Provisional application No. 60/221,555, filed on Jul. 28, 2000.

(51) Int. Cl.[7] ............................................. F16C 33/78
(52) U.S. Cl. .................................................... 384/486
(58) Field of Search ................................ 384/486, 147, 384/148, 484, 485

(56) References Cited

U.S. PATENT DOCUMENTS 4,699,526 A * 10/1987 Sato ........................... 384/486
5,042,822 A * 8/1991 Dreschmann et al. ....... 384/485
5,642,946 A * 7/1997 Caillault et al. ............ 384/477

* cited by examiner

Primary Examiner—Lenard A. Footland
(74) Attorney, Agent, or Firm—Pillsbury Winthrop LLP

(57) ABSTRACT

A sealed bearing assembly for supporting a rotating shaft and, in particular, a crankshaft of a two-stroke engine includes an inner race, an outer race and a plurality of roller elements disposed between the inner and outer races. A grease seal is disposed between the inner and outer races and spaced axially outward from the roller elements along an axis of the bearing assembly. The grease seal includes a rigid support structure and a flexible sealing member attached to the rigid support structure. The flexible sealing member includes at least one sealing lip, which contacts a surface of the inner race to provide a sealing engagement between the grease seal and the inner race, thereby retaining lubrication in an interior of the bearing from escaping at least to an interior of a crankcase of the engine and sealing at least the interior of the bearing against crankcase pressure variations in the engine.

28 Claims, 4 Drawing Sheets

SEALED BEARING

This application claims benefit to U.S. Provisional Patent Application Serial No. 60/221,555, which was filed on Jul. 28, 2000. The contents of that provisional application are incorporated herein by reference.

FIELD OF THE INVENTION

This invention relates to a sealed bearing assembly for an internal combustion engine and, more particularly, to a sealed bearing assembly for supporting a crankshaft of a two-stroke engine.

BACKGROUND OF THE INVENTION

In a conventional internal combustion engine, the crankshaft is rotationally supported by bearings positioned in the crankcase. In a conventional four-stroke automotive engine, these bearings are usually of the sliding (bushing) type lubricated by a pressurized oil feed. In a conventional four-stroke engine as commonly used in motorcycles, ATV's, etc., the crankshaft is often supported by roller bearings that are lubricated by either a pressurized oil feed and/or oil spray from the crankcase. In either case, the crankcase is isolated from the combustion chamber, as is conventionally known, so the crankshaft bearing lubricating oil is kept isolated from the combustion chamber. Separate grease seals are often positioned outboard of the bearings to provide sealing between the crankshaft and an exterior of the crankcase. In recent years, environmental considerations have dictated that exhaust emissions be reduced in internal combustion engines. In a four-stroke engine, such efforts concentrate on the combustion process, since the crankcase lubrication is isolated from the combustion process and does not increase exhaust emissions in a well-maintained engine.

This is not the case for a two-stroke engine. In a conventional two-stroke engine, as used in motorcycles, snowmobiles, personal watercraft, etc., the crankshaft is usually supported by roller bearings with separate seals mounted outboard of the bearings to seal in both the lubrication and the intake charge present in a conventional two-stroke crankcase. The roller bearings can be lubricated by oil mixed in with the intake gas charge that enters the crankcase and/or by oil injection directly to the bearings. However, any oil entering the crankcase of a conventional two-stroke will enter the intake charge and be forced into the combustion chamber through the transfer ports, as is known. Thus, this oil will be burned in the combustion process, thereby increasing exhaust emissions. As a result, decreasing exhaust emissions in a two-stroke engine necessarily requires efforts with respect to both the combustion process and the crankcase lubricating oil.

Certain approaches to limiting the amount of lubricating oil entering the crankcase in a two-stroke engine have proven somewhat successful in reducing exhaust emissions. In one approach, the amount of lubricating oil supplied to the intake charge is merely reduced, thereby reducing the amount of oil which does not come into contact with any lubrication requiring surface but which is merely burned during the combustion process. The problem with this approach is that as the amount of lubricating oil is reduced, the probability of inadequate bearing lubrication increases, especially in engines having high power output, with predictable undesirable results.

Other efforts generally concentrate on reducing the amount of oil supplied to the intake charge, but separately supplying smaller additional quantities of oil directly where it is needed to compensate for the leaner concentration of oil in the intake charge. For instance, the amount of oil required by the crankshaft bearings can be directly injected to those bearings while simultaneously reducing the amount of lubricating oil supplied to the intake gas charge. Thus, the overall amount of lubricating oil used is reduced, along with the exhaust emissions from burning the oil. On the other hand, the lower limit of the amount of lubricating oil supplied to the crankcase (and thus, the combustion chamber) will depend on the lubrication requirements of the engine components, such as the crankshaft and rod bearings, pistons, etc. In any event, the oil supplied to the crankcase will either be burned during the combustion process or exit in the exhaust as unburned hydrocarbons. In recent years, as technical advances have resulted in increased power outputs from two-stroke engines, existing crankshaft bearings have been less able to withstand this increased loading over time, especially as lubricating oil has been reduced to lower exhaust emissions.

One proposal to limit the free lubricant supplied to the intake charge is given in U.S. Pat. No. 3,641,990 to Kinnersly, issued Feb. 15, 1972. Kinnersly discloses the use of a one-sided crankshaft supported by a pair of crankshaft roller bearings enclosed on either end by seals, with an annular chamber disposed between the two roller bearings filled with lubricant at the time of engine assembly. Kinnersly discloses that such an arrangement can be used with either a two-stroke or a four-stroke engine and that the roller bearings and seals can be separate or integral units. There is no disclosure as to what type of seal should be used or how such a seal would be integrated into the roller bearing. In a four-stroke engine, this is less significant because the crankcase pressures are generally not high enough to interfere with the seals. It is also clear that with the use of the one-sided crankshaft, that the Kinnersly engine is not intended for high performance and the severe loadings resulting therefrom.

Furthermore, conventional sealed bearings cannot be used to support the crankshaft in a two-stroke engine. Such bearings usually use a grease seal having a single sealing lip contacting the inner race of the bearing to provide the sealing engagement. While such sealed bearings are capable of sealing the lubricant in the bearing, they are not effective at withstanding the pressure pulses in the crankcase and preventing the intake charge from escaping the crankcase. FIG. 4 shows such a sealed bearing 230 having an inner race 232, an outer race 234 and a plurality of roller elements 236 separated by a cage 238 disposed between the inner and outer races. A seal 240 having a narrow outer edge 242 is mounted in a counterbore 244 in outer race 234. The narrow outer edge 242 engages a groove 246 in the counterbore 244 to be retained in the bearing 230. Since the outer diameter of the outer edge 242 of seal 240 is greater than the outer diameter of counterbore 244, the seal 240 must be axially flexed to reduce the outer diameter of the seal so that the narrow outer edge 242 can engage the groove 246. The seal 240 has a single lip 248 backed by a circumferential spring 250 for providing a sealing engagement with the inner race 232. The axial flexibility of the seal 240 (necessary for installing the seal in the outer race), as well as the single lip 248 do not provide the desired effectiveness in preventing crankcase pressure loss.

While seals having two separate sealing lips for sealing the crankshaft/crankcase of a two-stroke engine are known, they have previously been used only as separate seals mounted outboard of the innermost crankshaft support bearings. See FIG. 3, which shows a partial section of a prior art two-stroke engine 10 of the assignee of the present invention where a separate seal 200 is mounted outboard of conventional crankshaft support bearing 202, which is similar in design to conventional crankshaft support bearing 46. The seal 200 has a narrow outer edge 204 that engages a groove 206 in the crankcase 16 to maintain the position of the seal. The seal includes a first circumferential sealing lip 208 and a spaced apart second circumferential sealing lip 210, the sealing lips backed by circumferential springs 212 and 214 respectively.

SUMMARY OF THE INVENTION

Therefore, the present invention is a sealed bearing suitable for use in a crankcase of an engine and, more particularly, for supporting a crankshaft in a high output two-stroke engine. The sealed bearing assembly includes an inner race and an outer race with a plurality of roller elements (bearings) disposed between the inner and outer races. The outer race includes a counterbore to one side of the plurality of roller elements along an axis of the bearing assembly with a bottom ledge of the counterbore spaced axially outward from the roller elements. A grease seal (or oil seal) is disposed between the inner and outer races and positioned in the outer race counterbore with the bottom ledge of the counterbore preventing the grease seal from contacting the roller elements when the grease seal is installed in the outer race.

The grease seal includes a rigid support structure and a flexible sealing member attached to the rigid support structure. The flexible sealing member includes first and second circumferential sealing lips spaced apart along the axis of the bearing, with each of the circumferential sealing lips contacting a surface of the inner race to provide a sealing engagement between the grease seal and the inner race. These two sealing lips increase the sealing capability of the bearing assembly. Thus, the grease seal retains lubrication in an interior of the bearing and prevents lubrication from escaping to the interior of the engine crankcase. The grease seal also prevents gases from the crankcase from escaping through the bearing due to crankcase pressure variations in the engine. The other side of the bearing can also be sealed as described above with lubricant disposed between the two seals, or in a preferred embodiment, open to a reservoir of lubricant. In a preferred embodiment, the flexible sealing member is constructed of Viton®.

In addition to reducing the lubrication in the intake charge, and thus, the objectionable exhaust emissions, the present invention also provides other benefits. First, since the lubrication is permanently supplied to the crankshaft bearings, the crankshaft bearings are properly lubricated upon start-up of the engine. This reduces damage to the bearings upon start-up, as can happen in an engine with conventionally lubricated bearings, especially if the engine is subjected to high loading prior to sufficient lubrication reaching the bearings. This is also important when the engine is used in applications where very low temperatures are encountered, such as in snowmobiles, and bearing clearances upon start-up are reduced due to the low temperature. The permanent lubrication prevents damage to the bearings under such conditions. This permanent lubrication can also prevent bearing damage even when the engine is warmed-up in situations where the lubrication to the bearings would otherwise be insufficient for the load experienced. Second, the permanent lubrication to the bearings can reduce the amount of lubricating oil required to be supplied to the intake charge, thus reducing the frequency of topping up the oil in the vehicle (in engines where the oil is injected into the intake stream, as opposed to premixed). Third, a broader array of lubricating oils and/or greases can be utilized for lubricating the bearings since no consideration need be given to the combustibility of the lubricant, its tendency to foul spark plugs or to leave unwanted deposits in the combustion chamber or exhaust. Thus, greater flexibility is provided when selecting a lubricant, especially when selecting a lubricant suitable for special operating conditions, such as very low temperature operation.

Therefore, it is an object of the present invention to reduce the amount of engine lubrication supplied to an intake charge of a two-stroke engine that enters the combustion chamber of the engine.

It is a further object of the present invention to reduce objectionable exhaust emissions of a two-stroke engine due to lubrication in the intake charge.

It is a further object of the preset invention to assure that the crankshaft bearings are properly lubricated under all normal operating conditions.

It is a further object of the present invention to provide more flexibility when selecting lubricants for lubricating the crankshaft bearings.

It is a further object of the present invention to provide a sealed crankshaft bearing assembly for a two-stroke engine effective at sealing lubrication in the bearing, as well as sealing against pressure loss from the crankcase.

The foregoing and other objects, features, characteristics and advantages of the present invention, as well as the methods of operation and functions of the related elements of structure, and the combination of parts and economies of manufacture, will be apparent from the following detailed description and the appended claims, taken in connection with the accompanying drawings, all of which form a part of the specification, wherein like reference numerals designate corresponding parts in the various figures.

DETAILED DESCRIPTION OF THE PREFERRED EMBODIMENTS

Figure 1:
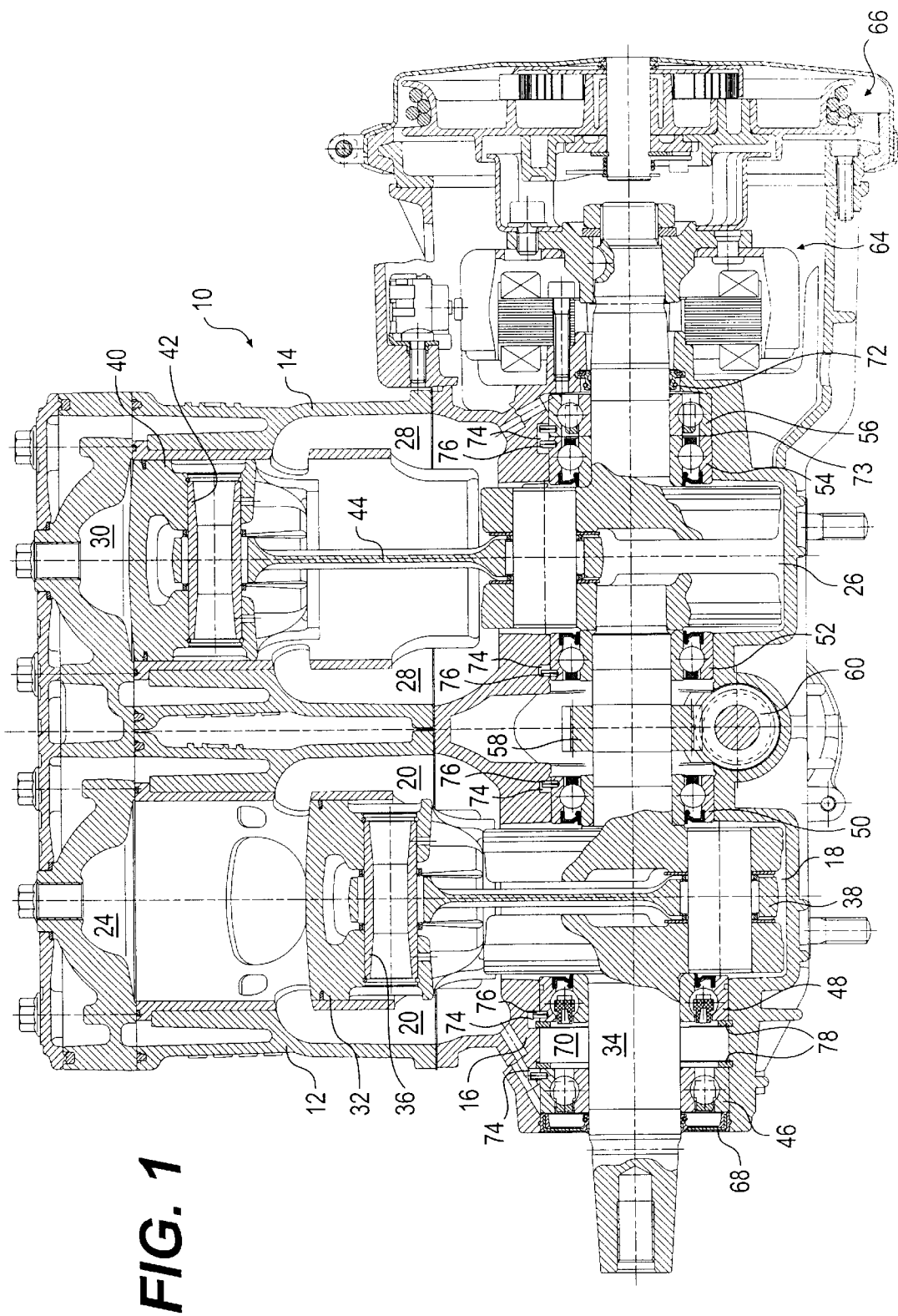
FIG. 1 is a sectional view of a two-stroke engine incorporating the sealed bearing assembly of the present invention.

FIG. 1 show a section view of an inline two cylinder, two-stroke engine 10 incorporating the sealed bearing 50 of the present invention. The engine 10 includes a first cylinder 12 and a second cylinder 14 mounted to a horizontally split crankcase 16. Crankcase 16 includes a first chamber 18 and a separate, second chamber 26. First chamber 18 is intermittently interconnected through transfer ports 20 to combustion chamber 24 of first cylinder 12, and second chamber 26 is intermittently interconnected through transfer ports 28 to combustion chamber 30 of second cylinder 14. Piston 32 is disposed in first cylinder 12 and is assembled to crankshaft 34 through piston pin 36 and connecting rod 38. Likewise, piston 40 is disposed in second cylinder 14 and is assembled to crankshaft 34 through piston pin 42 and connecting rod 44.

Crankshaft 34 is rotationally supported in the crankcase 16 by six roller bearings 46, 48, 50, 52, 54 and 56, of which, roller bearings 46 and 56 are conventional bearings and roller bearings 48, 50, 52 and 54 are designed according to the present invention. A gear 58 is mounted to crankshaft 34 for driving shaft 60 in chamber 62. Shaft 60 drives a rotary (or disc) valve (not shown) for controlling the intake to the chambers 18 and 26. Crankshaft 34 also drives an electrical generator 64 and a drive mechanism 66.

As is known in the art, rotation of the crankshaft 34 causes each piston to reciprocate in its respective cylinder between a bottom dead center and a top dead center, acting as a pump and opening and closing the ports in the cylinders to effectuate the combustion process. Briefly, as a piston moves up in the cylinder, it creates a vacuum in its respective crankcase chamber. This vacuum causes an intake charge to enter that chamber from an intake passage. As the piston moves down in the cylinder, it pressurizes the intake charge in the crankcase chamber until the transfer ports are uncovered by the piston, whereupon the intake charge is forced from the crankcase chamber to an interior of the cylinder through the transfer ports. As the piston moves up again in the cylinder, it compresses the intake charge in the cylinder into the combustion chamber for combustion while simultaneously again causing an intake charge to be sucked into the crankcase chamber.

For this process to work well, each crankcase chamber 18 and 26 must be well sealed against unintended leaks and isolated from each other. Therefore, it is important to have effective sealing between each chamber 18 and 26 and the crankshaft 34. In a conventional two-stroke engine, this is accomplished by placing separate grease (oil) seals on the outside of the crankshaft bearings because these bearings are lubricated by oil in the intake charge or direct oil injection. In the present invention sealed roller bearing assembly, the grease seals are placed between the bearing rollers and the respective crankcase chamber. In this way, lubrication can be permanently supplied to the bearing rollers without the necessity of exposing the bearing rollers to the intake charge.

As seen in FIG. 1, sealed bearing assemblies 48 and 50 mounted in crankcase 16 support the crankshaft 34 on respective sides of chamber 18. A conventional bearing 46 is mounted in the crankcase 16 outboard of bearing 48 and is sealed from the exterior by conventional grease seal 68. A sealed chamber 70 is disposed between bearings 46 and 48 for receiving a permanent supply of lubrication for the two bearings upon assembly of the engine. Alternatively, the chamber 70 can be connected to a separate oil supply for continuous lubrication of the two bearings. Similarly, sealed bearing assemblies 52 and 54 mounted in crankcase 16 support the crankshaft 34 on respective sides of chamber 26. A conventional bearing 56 is mounted in the crankcase 16 outboard of bearing 54 and is sealed from the exterior by conventional grease seal 72. A sealed chamber 73 is disposed between bearings 54 and 56 for receiving a permanent supply of lubrication for the two bearings upon assembly of the engine. Alternatively, the chamber 73 can be connected to a separate oil supply for continuous lubrication of the two bearings. Chamber 62 is adapted to receive a permanent supply of lubrication for the bearings 50 and 52 or can be connected to a separate oil supply for continuous lubrication of the two bearings, the gear 58 and the driving shaft 60. The crankcase 16 includes a plurality of bores 74 for respectively receiving positioning pins 76 mounted to the bearings 46–56 for properly positioning the bearings in the crankcase 16. Circlips 78 can optionally be used for engaging grooves in the crankcase 16 for additional positioning of one or more of the bearings.

Figure 2:
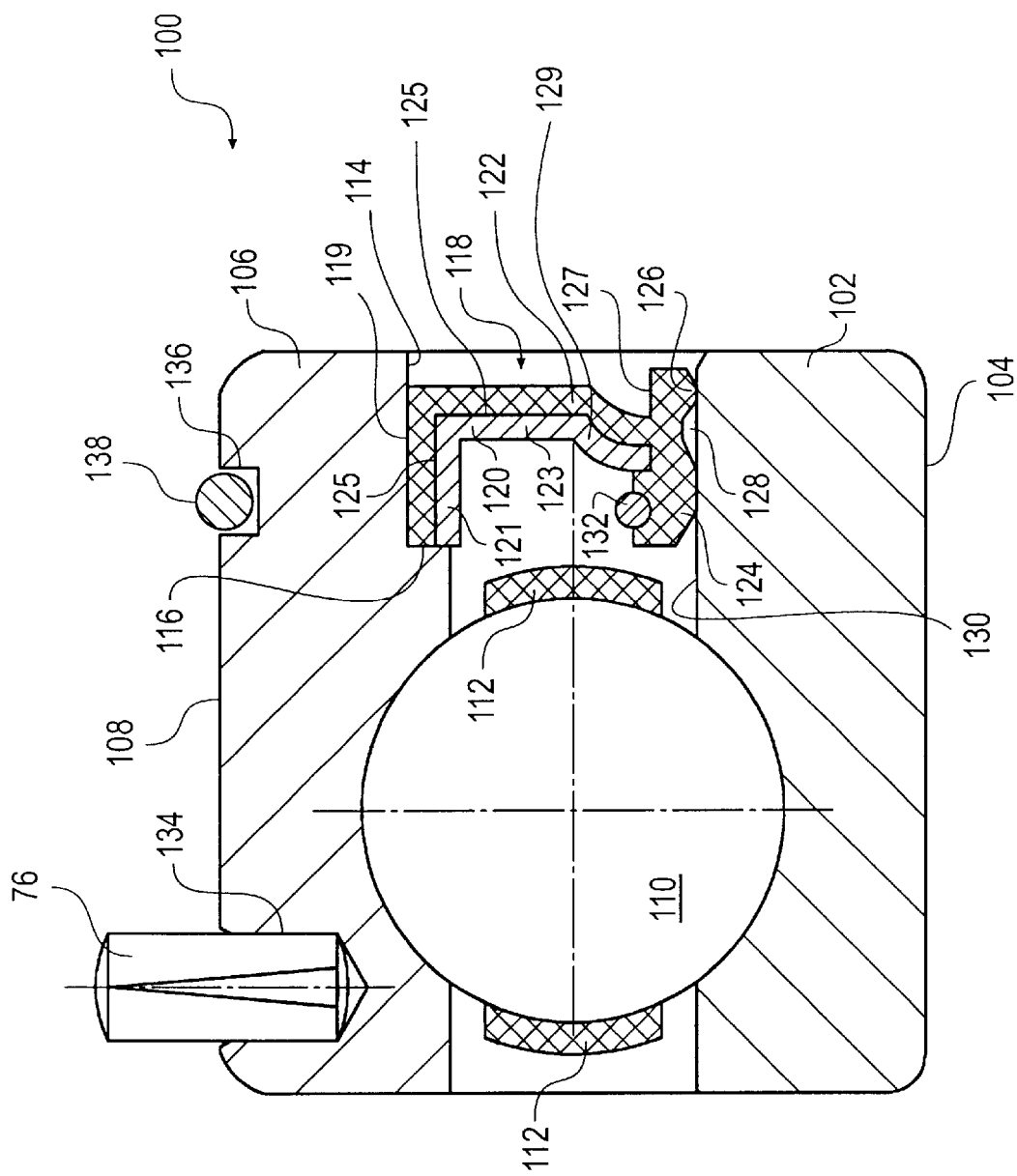
FIG. 2 is an enlarged partial sectional view of a sealed bearing assembly according to the present invention.
Figure 3:
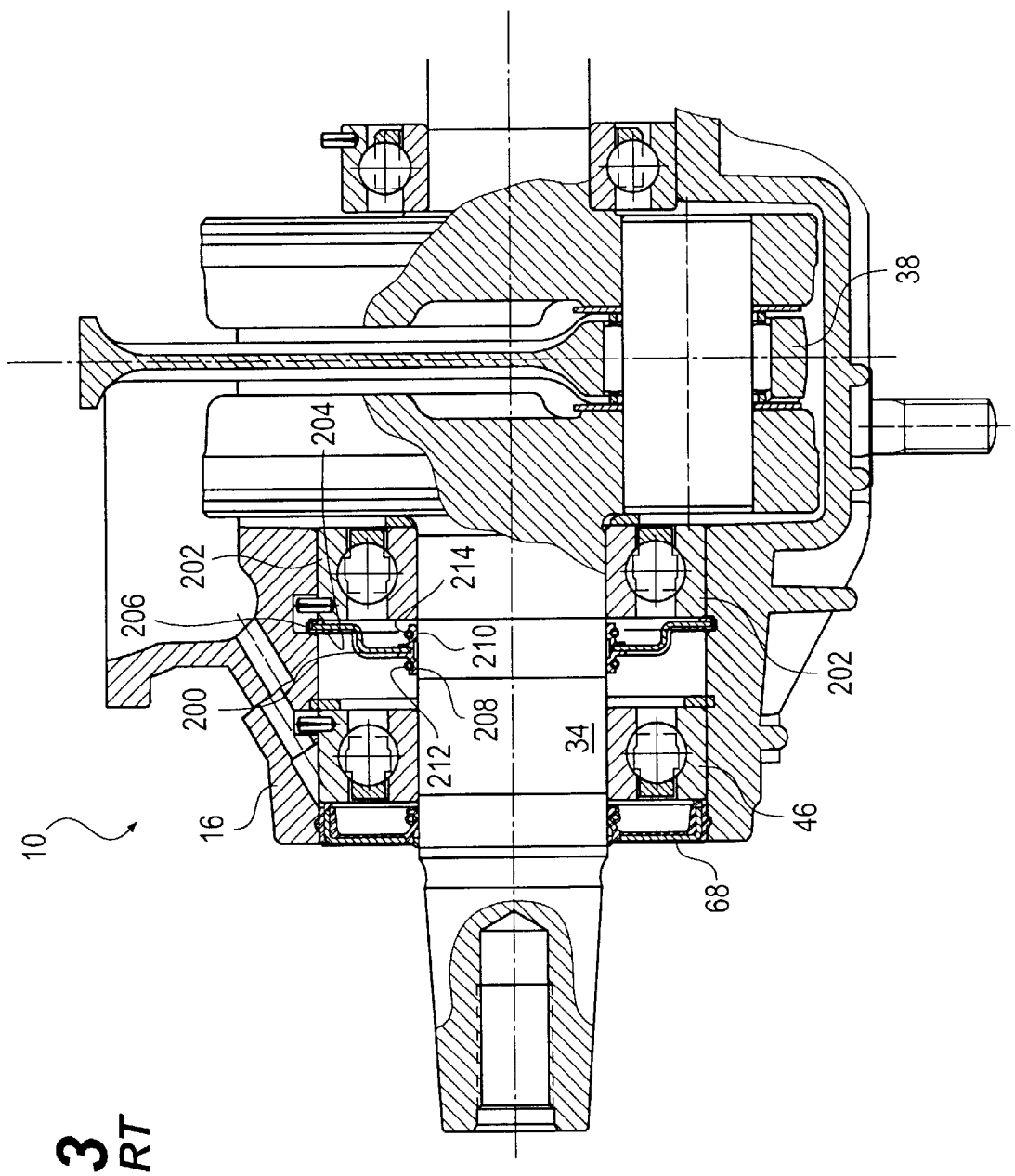
FIG. 3 is a partial sectional view of a prior art two-stroke engine.
Figure 4:
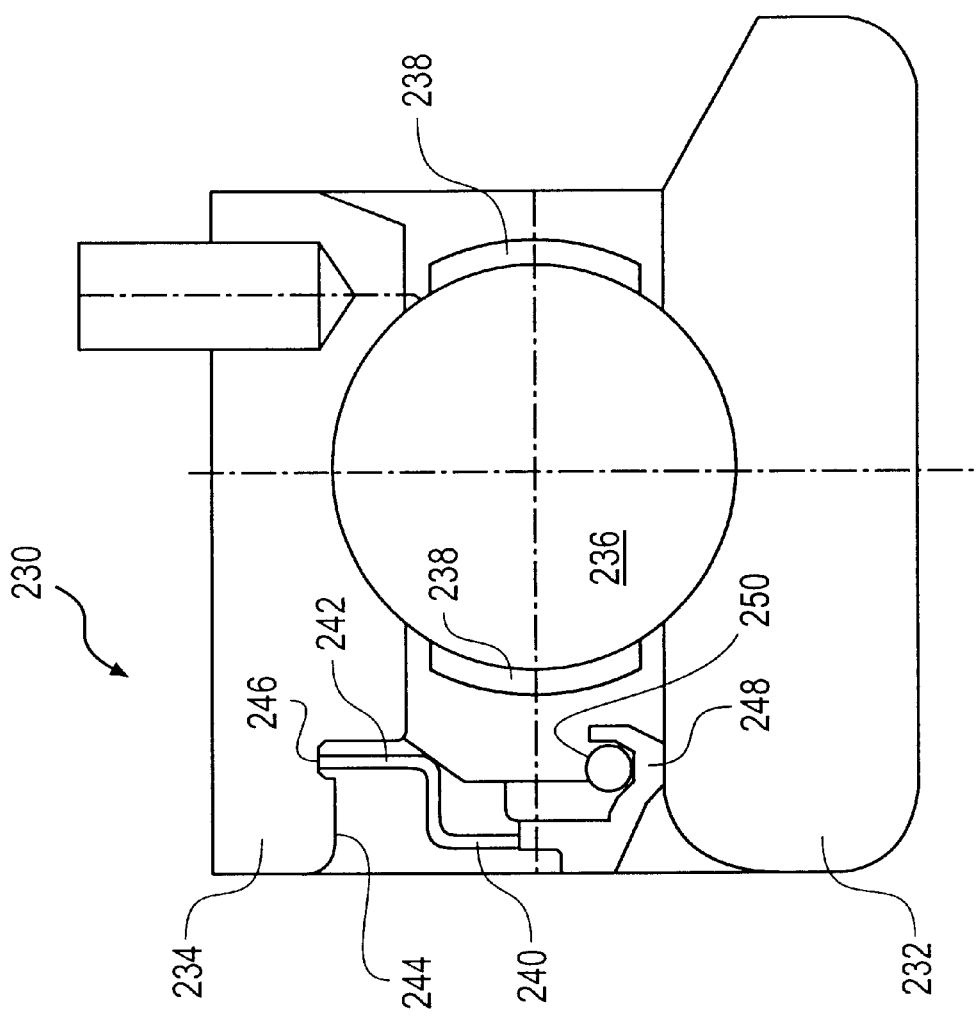
FIG. 4 is a partial sectional view of a prior art sealed bearing.

A representative example of the sealed roller bearing assemblies 48, 50, 52, and 54 is shown in partial section in FIG. 2 and indicated generally as 100. The bearing 100 includes an inner race 102 having an inner circumferential surface 104 for engaging the crankshaft 34. The bearing also includes an outer race 106 having an outer circumferential surface 108 for engaging the bore in crankcase 16 for mounting the bearing assembly 100. A plurality of roller elements 110 are rotationally disposed between the inner race 102 and outer race 106 as is conventionally known. A bearing cage 112 is provided for retaining the roller elements in a fixed positional relationship to one another. The outer race 106 includes a counterbore 114 having an inner ledge 116 positioned axially outward from the roller elements 110 and cage 112.

A grease seal 118 is disposed between the inner race 102 and the outer race 106. The grease seal is bottomed against the inner ledge 116 and is thereby prevented from moving any further axially inward and interfering with the movement of the cage 112 or roller elements 110. Without some such mechanism to prevent inward movement of the seal 118, it is possible that the pressures generated in the crankcase chambers 18 and 26 during rotation of the crankshaft 34 could force the seal toward the rollers 110 and cage 112 and cause interference between these components.

The grease seal 118 includes a rigid support structure 120 generally L-shaped in section with an axially extending outer circumferential portion 121 and an interconnected radially extending portion 123. A flexible sealing member 122 is attached to the rigid support structure 120. In the preferred embodiment, the sealing member 122 surrounds an outer side 125 of the rigid support structure 120 and is vulcanized onto the outer surface of the rigid support structure 120. This provides for ease of manufacture of the seal 118, as well as providing better sealing between the seal 118 and the outer race 106 because of the portion of the flexible sealing member 122 on the outside of the axially extending outer circumferential portion 121.

The flexible sealing member 122 includes a first circumferential sealing lip 124 and a second circumferential sealing lip 126 spaced apart along the axis of the bearing 100. A chamber 128 is provided between the two lips that can accommodate lubricant therein for lubricating the sealing lips. Each of the circumferential sealing lips 124 and 126 contact an outer circumferential surface 130 of the inner race 102 to provide a sealing engagement between the grease seal 118 and the inner race 102. A circumferential spring 132 is positioned behind the lip 124 to provide additional pressure to maintain the seal. In the preferred embodiment, a spring is not provided directly behind lip 126. However, a back portion 127 of lip 126 is exposed to the respective crankcase chamber. In this way, the pressure in the crankcase chamber presses the sealing lip 126 against the inner race 102, minimizing the need for a backing spring behind the lip 126 and eliminating the possibility that the spring might come off and damage the engine. This also minimizes the width of the seal since to use a second spring behind sealing lip 126 would require extending the portion of the seal behind lip 126 to accommodate the width of the spring, as can be seen with respect to the spring 132/sealing lip 124 combination. In an embodiment where the width of the seal 118 is of less concern, the seal can be provided with a circumferential spring behind each sealing lip. In a less demanding application, it may be possible to eliminate one of the sealing lips 124 or 126 and still provide the required sealing properties.

The rigid support structure 120 is curved toward the second sealing lip at its radially inner portion 129 to provide a greater exposed area behind lip 126 for increasing the effectiveness of the pressure assisted seal of lip 126. This curved portion also reduces the overall width of the seal by providing the greater exposed area behind lip 126 without having to extend the lip outward as would be the case if the radially inner portion did not curve toward the second lip. This two lip sealing engagement thus retains lubrication in an interior of the bearing 100 from escaping to an interior of a crankcase of the engine and also seals the interior of the bearing against crankcase pressure variations in the engine.

The seal 118 has a relatively wide outer surface 119 supported along a substantial portion of its width by the rigid support structure 120. This provides two advantages. First, it provides a relatively wide engagement between the outer surface 119 of the seal 118 and the counterbore 114. This wide engagement surface provides additional friction to maintain the seal in place in the counterbore 114. Second, the wide axially extending outer surface and underlying L-shaped rigid support structure 120 increase the overall axial rigidity of the seal and prevent unwanted axial flexing of the flexible sealing member that would be detrimental to the sealing capability of the seal 118. The outer diameter of the seal 118 is approximately the same as the diameter of the counterbore 114 so that it can be easily pressed into place in the counterbore 114. This is preferable to the other known sealed bearing assemblies discussed above where the outer diameter of the seal is larger than the counterbore in the outer race and is adapted to engage a groove in the counterbore. In such assemblies, an outer flange of the seal must be flexed to allow the outer edge of the seal to reduce in diameter sufficiently to enter and engage the groove.

The flexible components of conventional seals are generally made of NBR (acrylonitrile-butadiene rubber) with a Teflon® (polytetraflouroethylene) sealing lip vulcanized into the NBR. It has been found that such seals have difficulty following the crankshaft movements due to the clearances in the bearings and therefore, have difficulty providing adequate sealing. Thus, in a preferred embodiment of the present invention, the flexible sealing member 122 is made entirely of Viton® (FPM or fluorinated rubber). This material is more flexible and heat resistant than conventional materials and provides better sealing of the sealed bearing assembly. While Viton® is preferred, other materials can be used as conditions warrant. The rigid support structure can be made of any appropriate rigid material and in the preferred embodiment, is made of metal, and particularly, steel.

Positioning pin 76 is mounted in a bore 134 in outer race 106 for positioning the bearing 100 with respect to the crankcase 16 and for preventing the bearing from rotating in the crankcase. Outer race 106 optionally includes a groove 136 around its outer circumferential surface 108 for receiving an o-ring 138 to provide a seal between the exterior of the bearing and the crankcase 16.

Although seal 118 is referred to as a grease seal, it is intended that the lubrication for the bearings can be either grease or oil, as is appropriate, and that the seal 118 will provide a seal for either type of lubricant. In the preferred embodiment, grease is used that has a relatively flat viscosity from approximately −5020 C. to 150° C. with a fluid point at approximately 240° C. This grease includes a component of oil. This grease can be a polyalphaolelin or oil based esther. One specific grease that can be used is Klüber Isoflex NB52, no. 004131, available from Klüber in Germany.

The size and dimensions of the sealed bearing assembly of the present invention can be varied as is appropriate for the engine application, taking into account, for instance, the space availability in the crankcase, engine power output and bearing loading therefrom, maximum rpm and number of crankshaft support bearings utilized. While the present invention bearing is shown in a rotary valve two-stroke engine, it can also be used in other types of two-stroke engines. Such engines can use piston port timing, as well as reed valves or rotary valves and can be air or liquid cooled. Fuel can be supplied by either a carburetor or by fuel injection. Lubricating oil can either be pre-mixed with the fuel or injected into the intake charge. The present invention bearing can be used in single or multiple cylinder engines. While the preferred use of the present invention bearing is as a crankshaft support bearing in a high output two-stroke engine, it can be used in other applications requiring a sealed bearing assembly capable of sealing both lubrication in the bearing and preventing pressure loss through the bearing.

While this invention has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the invention following, in general, the principles of the invention and including such departures from the present disclosure as come within known or customary practice in the art to which the invention pertains, and as may be applied to the essential features hereinbefore set forth and followed in the spirit and scope of the appended claims.

What is claimed:

1. A sealed crankshaft bearing assembly for a two-stroke engine, comprising:
    an inner race;
    an outer race having an inner ledge;
    a plurality of rolling elements disposed between the inner and outer races; and
    a grease seal disposed between the inner and outer races and spaced axially outward from the rolling elements along an axis of the bearing assembly, the grease seal including,
        a rigid support structure;
        a flexible sealing member attached to the rigid support structure, the flexible sealing member including at least two sealing lips contacting a surface of the inner race to provide a sealing engagement between the grease seal and the inner race, thereby retaining lubrication in an interior of the bearing from escaping at least to an interior of a crankcase of the engine and sealing at least the interior of the bearing against crankcase pressure variations in the engine, wherein the grease seal contacts both the inner race and the outer race, wherein at least one of the rigid support structure and the flexible sealing member contacts the inner ledge, and
        a circumferential spring engaging a surface of the flexible sealing member opposite the ledge to provide additional force in maintaining at least one of the sealing lips in engagement with the inner race, wherein the outer race includes a counterbore to one side of the plurality of rolling elements along the axis of the bearing assembly, wherein the inner ledge is formed by the counterbore and is spaced axially outward from the roller elements, the grease seal being positioned in the outer race counterbore, the inner ledge of the counterbore preventing the grease seal from contacting the rolling elements when the grease seal is installed in the outer race.

2. The bearing assembly of claim 1, wherein the at least two sealing lips comprises:
   a first circumferential sealing lip; and
   a second circumferential sealing lip disposed apart from the first circumferential sealing lip along the axis of the bearing assembly,
   wherein the first and second circumferential sealing lips contact the surface of the inner race.

3. The bearing assembly of claim 2, wherein the rigid support structure is generally L-shaped in section, having an axially extending outer circumferential portion and an interconnected radially extending portion.

4. The bearing assembly of claim 1, wherein the circumferential spring engages a radially outward surface of the flexible sealing member to provide additional force in maintaining at least one of the sealing lips in engagement with the inner race.

5. The bearing assembly of claim 4, wherein the circumferential spring is positioned behind the circumferential sealing lip positioned closest to the rolling elements and a back portion of the circumferential sealing lip positioned closest to the interior of the crankcase is exposed to the interior of the crankcase so that pressure in the interior of the crankcase during operation of the engine presses the sealing lip against the inner race to maintain the sealing lip in engagement with the inner race.

6. The bearing assembly of claim 5, wherein a radially inward portion of the rigid support structure is bent toward the spring backed sealing lip so that the exposed portion of the circumferential sealing lip positioned closest to the interior of the crankcase is increased to increase the effect of the crankcase pressure in maintaining that sealing lip in engagement with the inner race.

7. The bearing assembly of claim 1, wherein the flexible sealing member is made of one of fluorinated rubber and FPM.

8. The bearing assembly of claim 1, and further comprising:
   a bearing cage for retaining the rolling elements in a fixed positional relationship to one another.

9. The bearing assembly of claim 1, wherein the outer race includes an engaging member adapted for rotationally fixing the outer race with respect to a crankcase of the engine.

10. The bearing assembly of claim 1, wherein the rigid support structure is generally L-shaped in section, having an axially extending outer circumferential portion and an interconnected radially extending portion.

11. The bearing assembly of claim 10, wherein the flexible sealing member covers an outer surface of the rigid support structure.

12. The bearing assembly of claim 11, wherein the flexible sealing member is vulcanized to the outer surface of the rigid support structure.

13. A sealed crankshaft bearing assembly for a two-stroke engine, comprising:
   an inner race;
   an outer race having an inner ledge;
   a plurality of rolling elements disposed between the inner and outer races; and
   a grease seal disposed between the inner and outer races and spaced axially outward from the rolling elements along an axis of the bearing assembly, the grease seal including,
      a rigid support structure;
      a flexible sealing member attached to the rigid support structure, the flexible sealing member including at least two sealing lips contacting a surface of the inner race to provide a sealing engagement between the grease seal and the inner race, thereby retaining lubrication in an interior of the bearing from escaping at least to an interior of a crankcase of the engine and sealing at least the interior of the bearing against crankcase pressure variations in the engine, wherein the grease seal contacts both the inner race and the outer race, wherein at least one of the rigid support structure and the flexible sealing member contacts the inner ledge, and
      a circumferential spring engaging a surface of the flexible sealing member opposite the ledge to provide additional force in maintaining at least one of the sealing lips in engagement with the inner race, wherein the outer race includes a counterbore to one side of the plurality of rolling elements along the axis of the bearing assembly, wherein the circumferential spring engages a radially outward surface of the flexible sealing member to provide additional force in maintaining at least one of the sealing lips in engagement with the inner race.

14. The bearing assembly of claim 13, wherein the circumferential spring is positioned behind the circumferential sealing lip positioned closest to the rolling elements and a back portion of the circumferential sealing lip positioned closest to the interior of the crankcase is exposed to the interior of the crankcase so that pressure in the interior of the crankcase during operation of the engine presses the sealing lip against the inner race to maintain the sealing lip in engagement with the inner race.

15. The bearing assembly of claim 13, wherein a radially inward portion of the rigid support structure is bent toward the spring backed sealing lip so that the exposed portion of the circumferential sealing lip positioned closest to the interior of the crankcase is increased to increase the effect of the crankcase pressure in maintaining that sealing lip in engagement with the inner race.

16. The bearing assembly of claim 13, wherein the flexible sealing member is made of fluorinated rubber.

17. The bearing assembly of claim 13, and further comprising:
   a bearing cage for retaining the rolling elements in a fixed positional relationship to one another.

18. The bearing assembly of claim 13, wherein the outer race includes an engaging member adapted for rotationally fixing the outer race with respect to a crankcase of the engine.

19. The bearing assembly of claim 13, wherein the rigid support structure is generally L-shaped in section, having an axially extending outer circumferential portion and an interconnected radially extending portion.

20. The bearing assembly of claim 13, wherein the flexible sealing member covers an outer surface of the rigid support structure.

21. The bearing assembly of claim 20, wherein the flexible sealing member is vulcanized to the outer surface of the rigid support structure.

22. A sealed crankshaft bearing assembly for a two-stroke engine, comprising:
   an inner race;
   an outer race;
   a plurality of rolling elements disposed between the inner and outer races; and
   a grease seal disposed between the inner and outer races and spaced axially outward from the rolling elements along an axis of the bearing assembly, the grease seal including, a rigid support structure; and a flexible sealing member attached to the rigid support structure, the flexible sealing member including at least one sealing lip contacting a surface of the inner race to provide a sealing engagement between the grease seal and the inner race, thereby retaining lubrication in an interior of the bearing from escaping at least to an interior of a crankcase of the engine and sealing at least the interior of the bearing against crankcase pressure variations in the engine, wherein a back portion of the circumferential sealing lip positioned closest to the interior of the crankcase is exposed to the interior of the crankcase so that pressure in the interior of the crankcase during operation of the engine presses the sealing lip against the inner race to maintain the sealing lip in engagement with the inner race.

23. The bearing assembly of claim 22, wherein a radially inward portion of the rigid support structure is bent toward the spring backed sealing lip so that the exposed portion of the circumferential sealing lip positioned closest to the interior of the crankcase is increased to increase the effect of the crankcase pressure in maintaining that sealing lip in engagement with the inner race.

24. The bearing assembly of claim 22, wherein the flexible sealing member is made of fluorinated rubber.

25. The bearing assembly of claim 22, and further comprising:

a bearing cage for retaining the rolling elements in a fixed positional relationship to one another.

26. The bearing assembly of claim 22, wherein the outer race includes an engaging member adapted for rotationally fixing the outer race with respect to a crankcase of the engine.

27. The bearing assembly of claim 22, wherein the flexible sealing member covers an outer surface of the rigid support structure.

28. The bearing assembly of claim 27, wherein the flexible sealing member is vulcanized onto the outer surface of the rigid support structure.

* * * * *